US012378820B2

(12) United States Patent
Lu

(10) Patent No.: US 12,378,820 B2
(45) Date of Patent: Aug. 5, 2025

(54) TWO-SCREW ADJUSTABLE POSITION LIMITING DEVICE

(71) Applicant: NINGBO JIESHU WINDOW COVERINGS MANUFACTURING CO. LTD., Yuyao (CN)

(72) Inventor: Jiebing Lu, Yuyao (CN)

(73) Assignee: NINGBO JIESHU WINDOW COVERINGS MANUFACTURING CO. LTD. (CN)

(*) Notice: Subject to any disclaimer, the term of this patent is extended or adjusted under 35 U.S.C. 154(b) by 175 days.

(21) Appl. No.: 18/330,929

(22) Filed: Jun. 7, 2023

(65) Prior Publication Data

US 2024/0218738 A1 Jul. 4, 2024

(30) Foreign Application Priority Data

Jan. 4, 2023 (CN) ......................... 202310008203.4

(51) Int. Cl.
*E06B 9/88* (2006.01)

(52) U.S. Cl.
CPC ..................................... *E06B 9/88* (2013.01)

(58) Field of Classification Search
CPC ..... E06B 9/88; E06B 9/42; E06B 9/60; E06B 9/50; E06B 9/40; E06B 2009/6881
See application file for complete search history.

(56) References Cited

U.S. PATENT DOCUMENTS

| | | | | |
|---|---|---|---|---|
| 1,725,285 | A * | 8/1929 | Lalonde .................... | E06B 9/88 160/295 |
| 5,044,417 | A * | 9/1991 | Bresson .................... | E06B 9/72 160/310 |
| 7,147,030 | B2 * | 12/2006 | Dalle Nogare ........... | E06B 9/56 160/315 |
| 10,655,388 | B2 * | 5/2020 | Smith ....................... | E06B 9/42 |
| 11,125,009 | B2 * | 9/2021 | Huang ...................... | E06B 9/34 |
| 11,512,529 | B2 * | 11/2022 | Fisher ....................... | E06B 9/50 |
| 2011/0139380 | A1 * | 6/2011 | Anthony ................... | E06B 9/56 160/293.1 |
| 2015/0376941 | A1 * | 12/2015 | Fujita ........................ | E06B 9/58 160/241 |
| 2018/0106107 | A1 * | 4/2018 | Smith ....................... | E06B 9/34 |
| 2019/0376340 | A1 * | 12/2019 | Smith ....................... | E06B 9/88 |
| 2022/0316273 | A1 * | 10/2022 | Smith ....................... | E06B 9/88 |

* cited by examiner

*Primary Examiner* — Abe Massad
(74) *Attorney, Agent, or Firm* — Marian E. Fundytus; Amster Rothstein & Ebenstein LLP

(57) ABSTRACT

The two-screw adjustable position limiting device of the present invention includes a connecting rod base, a screw rod base, and a fixing plate. A head portion of the connecting rod base is a mounting plate, and an accommodating body (a) passes through the middle of the mounting plate and is connected thereto. A bottom portion of the accommodating body is provided with a screw body. A bottom portion of the connecting rod base is fixed on a fixing base. A head portion of the screw rod base is a fluted disc, and an accommodating body (b) passes through the middle of the fluted disc and is connected thereto. Beneficial effects of the present invention are as follows: the upper limit can be fixed, and the position at which the lower limit is fixed can be adjusted.

8 Claims, 4 Drawing Sheets

TWO-SCREW ADJUSTABLE POSITION LIMITING DEVICE

CROSS REFERENCE TO RELATED APPLICATIONS

The present application claims priority to China Application No. 202310008203.4, filed on Jan. 4, 2023, the subject matter of which is incorporated herein by reference in its entirety.

TECHNICAL FIELD

The present invention relates to the field of curtains, in particular to a two-screw adjustable position limiting device.

BACKGROUND

The up and down curtain lifting is achieved through a curtain header, which usually requires a position limiting device. However, ordinary position limiting devices can only fix the upper limit or the lower limit, which is inconvenient to use.

SUMMARY

To address the above technical problem in which only the upper limit or the lower limit can be fixed, the present invention provides a two-screw adjustable position limiting device.

The technical solutions of the present invention are as follows:

The two-screw adjustable position limiting device comprises a connecting rod base, a screw rod base, and a fixing plate, wherein a head portion of the connecting rod base is a mounting plate, and an accommodating body a passes through the middle of the mounting plate and is connected thereto, a bottom portion of the accommodating body a is provided with a screw body, the screw body is provided with a gap from left to right, and a bottom portion of the connecting rod base is fixed on a fixing base, a head portion of the screw rod base is a fluted disc, an accommodating body b passes through the middle of the fluted disc and is connected thereto, a bottom portion of the accommodating body b is provided with a screw rod, the screw rod base is inserted into the connecting rod base, and a movable fixing device is sleeved on the screw rod and protrudes from the gap, a head cover is sleeved on the outside of the accommodating body a, a cross core rod body protrudes from a perforation in the fixing plate, and an accommodating body c passes through the middle of the fixing plate and is connected thereto, a spring is provided at bottom portions of the accommodating body c and the cross core rod body, the cross core rod body engages with the accommodating body c, and a rotary wheel is sleeved on the screw body.

A bottom portion of the screw body is provided with a position limiting block, and a side wall of the position limiting block is provided with a through-hole.

A surface of the fixing base is provided with an annular recess, the middle of the annular recess is provided with an engagement recess for fixing the position limiting block, and a hole is provided at a side of the engagement recess.

The perforation is a non-circular hole, and upper and lower sides of the perforation are parallel to each other, and left and right sides of the perforation are curved.

The cross core rod body is provided in the accommodating body b. A head portion of the cross core rod body is a cross core base, and a cross-section of the cross core base is cross-shaped.

A stop bar is provided at the middle of a bottom portion of the accommodating body c, and the cross core rod body is provided in the accommodating body c, wherein a lower part of the cross core rod body is provided with a fastener, the fastener is fastened on two sides of the bottom portion of the accommodating body c, and a spring is provided between the bottom portion of the cross core rod body and the stop bar.

The bottom portion of the accommodating body a is provided with a screw engagement gap a, the rotary wheel is provided with a screw engagement gap b, the screw engagement gap a is in contact with the screw engagement gap b, and protrusions are evenly distributed on a side wall of the rotary wheel.

Fixing strips are provided on upper and lower sides of a surface of the mounting plate, intervals are present between the fixing strips, and position limiting blocks b arranged on two sides of a rear surface of the fixing plate are engaged at the intervals.

The technical solutions of the present invention provide a novel structure and ingenious and simple design, which not only can fix the upper limit but can also adjust the position at which the lower limit is fixed, thereby better meeting the requirements of adjusting different heights of curtains.

DETAILED DESCRIPTION

The present invention is further described in detail in combination with the drawings and embodiment.

Embodiment

Figure 1:
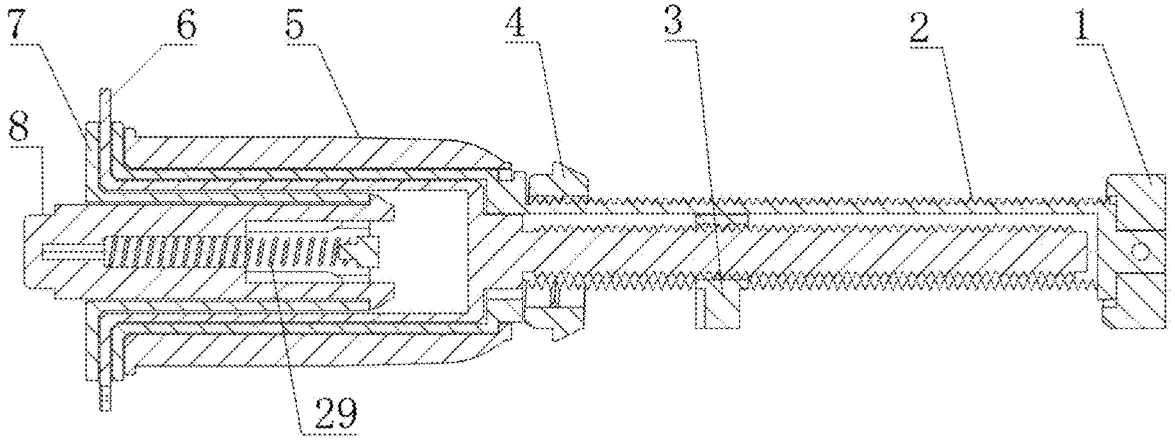
FIG. 1 is a structural schematic diagram of the present invention.
Figure 2:
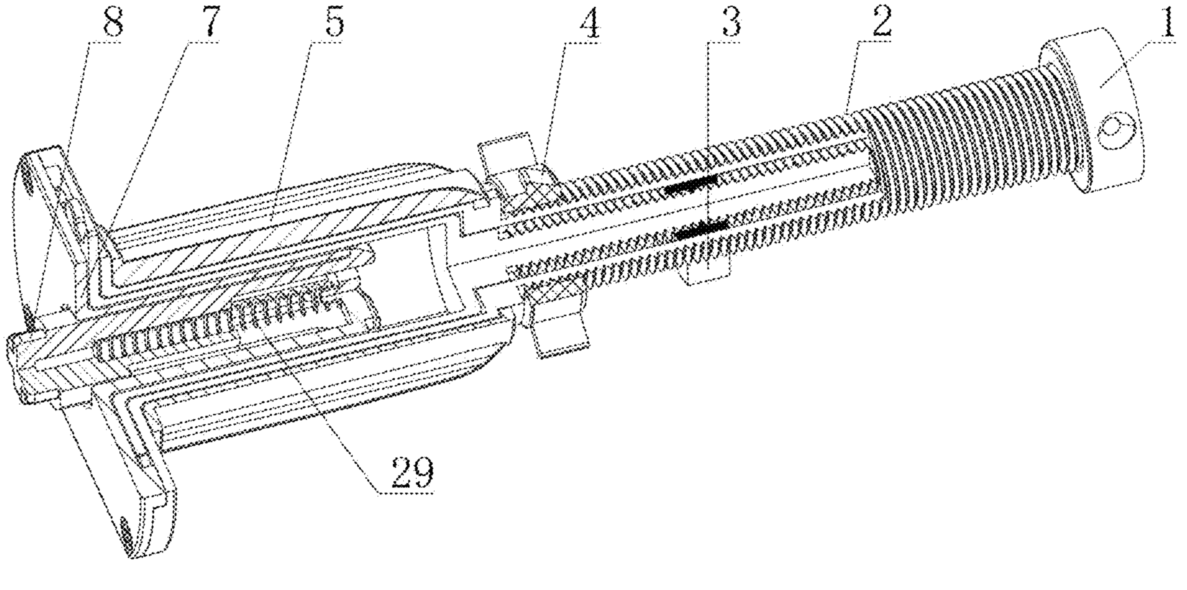
FIG. 2 is a structural schematic diagram of an embodiment of the present invention.
Figure 3:
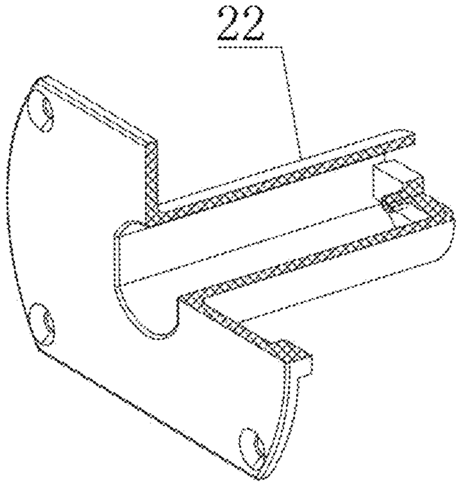
FIGS. 3 and 4 are structural schematic diagrams of the fixing plate of the present invention.
Figure 4:
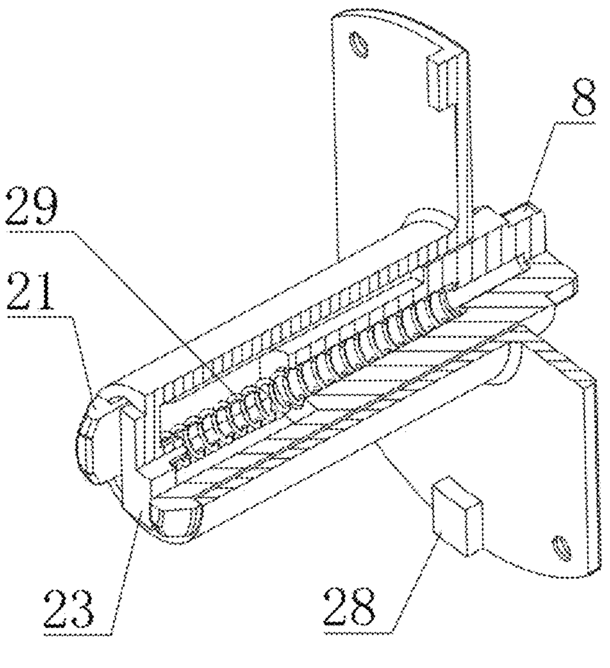
Figure 5:
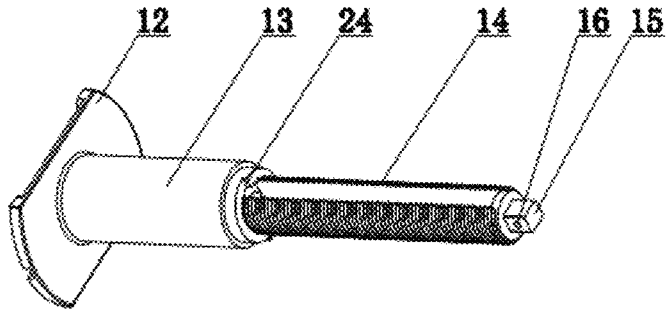
FIGS. 5 and 11 are structural schematic diagrams of the connecting rod base of the present invention.
Figure 6:
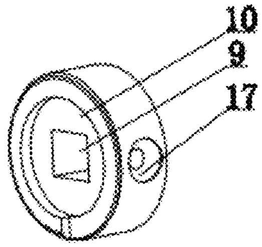
FIG. 6 is a structural schematic diagram of the fixing base of the present invention.
Figure 7:
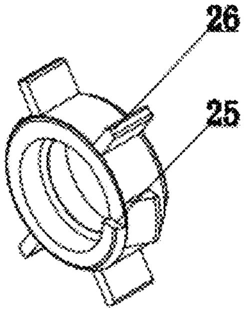
FIG. 7 is a structural schematic diagram of the rotary wheel of the present invention.
Figure 8:
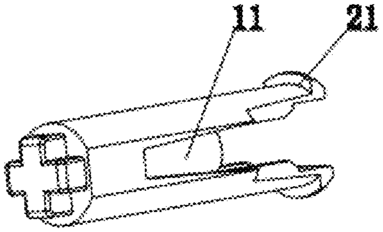
FIG. 8 is a structural schematic diagram of the movable fixing device of the present invention.
Figure 9:
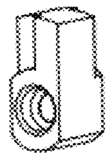
FIG. 9 is a structural schematic diagram of the cross core rod body of the present invention.
Figure 10:
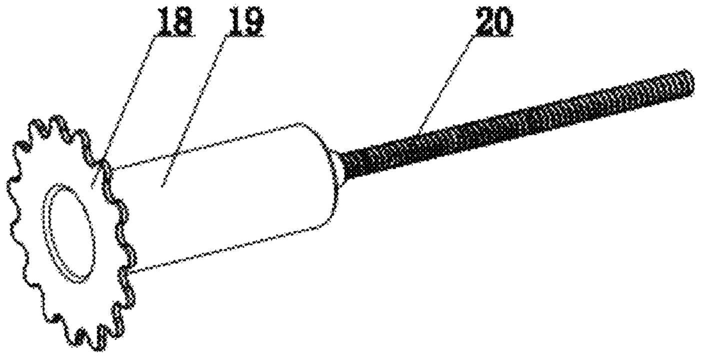
FIG. 10 is a structural schematic diagram of the screw rod base of the present invention.
Figure 11:
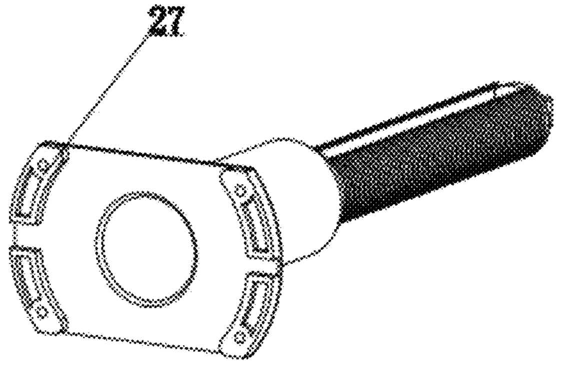

The two-screw adjustable position limiting device shown in FIGS. 1. 2, 3, 4, 5, 6, 7, 8, 9, 10, and 11 includes a connecting rod base 2, a screw rod base 6, and a fixing plate 7. A head portion of the connecting rod base 2 is a mounting plate 12, and an accommodating body a13 passes through the middle of the mounting plate 12 and is connected thereto. A bottom portion of the accommodating body a13 is provided with a screw body 14, the screw body 14 is provided with a gap from left to right, and a bottom portion of the connecting rod base 2 is fixed on a fixing base 1.

Ahead portion of the screw rod base 6 is a fluted disc 18, and an accommodating body b19 passes through the middle of the fluted disc 18 and is connected thereto. A bottom portion of the accommodating body b19 is provided with a screw rod 20. The screw rod base 6 is inserted into the connecting rod base 2. A movable fixing device 3 is sleeved on the screw rod 20 and protrudes from the gap. A head cover 5 is sleeved on the outside of the accommodating body a13. A cross core rod body 8 protrudes from a perforation in the fixing plate 7, and an accommodating body c22 passes through the middle of the fixing plate 7 and is connected thereto. A spring 29 is provided at bottom portions of the accommodating body c22 and the cross core rod body 8. The cross core rod body 8 engages with the accommodating body c22. A rotary wheel 4 is sleeved on the screw body 14.

A bottom portion of the screw body 14 is provided with a position limiting block 15, and a side wall of the position limiting block 15 is provided with a through-hole 16.

A surface of the fixing base 1 is provided with an annular recess 10, the middle of the annular recess 10 is provided with an engagement recess 9 for fixing the position limiting block 15, and a hole 17 is provided at a side of the engagement recess 9. The fixing base 1 has a fixing function and limits the movement of the movable fixing device 3 to prevent the same from going beyond the range of motion.

The perforation is a non-circular hole, and upper and lower sides of the perforation are parallel to each other, and left and right sides of the perforation are curved.

The cross core rod body 8 is provided in the accommodating body b19. A head portion of the cross core rod body 8 is a cross core base, and a cross-section of the cross core base is cross-shaped.

A stop bar 23 is provided at the middle of a bottom portion of the accommodating body c22, and the cross core rod body 8 is provided in the accommodating body c22. A lower part of the cross core rod body 8 is provided with a fastener 21. the fastener 21 is fastened on two sides of the bottom portion of the accommodating body c22, and a spring 29 is provided between the bottom portion of the cross core rod body 8 and the stop bar 23.

The bottom portion of the accommodating body a13 is provided with a screw engagement gap a24, the rotary wheel 4 is provided with a screw engagement gap b25, the screw engagement gap a24 is in contact with the screw engagement gap b25, and protrusions 26 are evenly distributed on a side wall of the rotary wheel 4.

Fixing strips 27 are provided on upper and lower sides of a surface of the mounting plate 12. Intervals are present between the fixing strips 27, and position limiting blocks b27 arranged on two sides of a rear surface of the fixing plate 7 are engaged at the intervals. The fixing strips 27 are provided with hole bases and are fixed by screws, and the position limiting block b27 is fastened between two position limiting blocks b27 so as to achieve a position limiting function.

When in use, the screw rod base 6 rotates, and the screw rod 20 rotates along with the screw rod base 6, driving the movable fixing device 3 to move left and right. so as to move and adjust the fixing position to achieve lower limit adjustment. The rotary wheel 4 is located between the movable fixing device 3 and the accommodating body a13, and the screw body 14 is provided with the rotary wheel 4. By means of the fixing plate 7, the screw body 14, and the fixing base 1, the rotary wheel 4 rotates on a screw thread and moves to different positions, thereby fixing both the upper limit and the lower limit. The upper limit position is an inner wall of the fixing base that contacts a wall. At the time, a curtain tube is at the highest position. The lower limit position is a movable position. The rotary wheel is movably disposed at an adjustable position. At the time, the curtain tube can be at any position. The extension and retraction of the cross core rod body 8 is fixed, and the cross core rod body 8 is fixed to the fixing plate 7 to prevent the same from rotating. Components are provided to fasten the cross core base to prevent the same from rotating. Two side walls of the cross core rod body 8 extend downward to form the fastener 21, and an annular body 11 is provided in the middle of a bottom portion. The annular body 11 fixes the spring 29 to prevent the same from falling off, and the spring 29 can be easily expanded and contracted and installed. The reference number 28 represents a boss, which is used for positioning during installation, facilitating the installation, and also serves to enhance the resistance to torsion. The head cover cooperates with the curtain tube to rotate.

It should be understood that the above embodiment is only a preferred embodiment of the present invention, which shall not limit the technical solutions of the present invention. To a person having ordinary skill in the art, any additions, deletions, substitutions, transformations, or improvements conforming to the spirit and principle of the present invention can be made according to the above description. Corresponding technical solutions after these additions, deletions, substitutions, transformations, or improvements should all belong to the scope of protection of the claims of the present invention.

The invention claimed is:

1. A two-screw adjustable position limiting device, comprising a connecting rod base (2), a screw rod base (6), and a fixing plate (7), characterized in that: a head portion of the connecting rod base (2) is a mounting plate (12), wherein the mounting plate (12) has a first end, a middle, and a second end, and an accommodating body a (13), wherein the accommodating body a has a top portion and a bottom portion, and an inside portion and an outside portion, passes through the middle of the mounting plate (12) and is connected thereto, the bottom portion of the accommodating body a (13) is provided with a screw body (14), the screw body (14) is provided with a gap extending along an axis of the screw body, a bottom portion of the connecting rod base (2) is fixed on a fixing base (1), wherein the fixing base (1) has a surface, a head portion of the screw rod base (6) is a fluted disc (18), wherein the fluted disc (18) has a first end, a middle, and a second end, and an accommodating body b (19) passes through the middle of the fluted disc (18) and is connected thereto, a bottom portion of the accommodating body b (19) is provided with a screw rod (20), the screw rod base (6) is inserted into the connecting rod base (2), a movable fixing device (3) is sleeved on the screw rod (20) and protrudes from the gap, a head cover (5) is sleeved on the outside of the accommodating body a (13), a cross core rod body (8) protrudes from a perforation in the fixing plate (7), wherein the fixing plate (7) has a first end, a middle, and a second end, an accommodating body c (22), wherein the accommodating body c has a bottom portion, a middle portion, and a top portion, passes through the middle of the fixing plate (7) and is connected thereto, a spring (29) is provided at the bottom portion of the accommodating body c (22) and the spring (29) is provided at a bottom portion of the cross core rod body (8), the cross core rod body (8) engages with the accommodating body c (22), and a rotary wheel (4) is sleeved on the screw body (14).

2. The two-screw adjustable position limiting device according to claim 1, wherein a bottom portion of the screw body (14) is provided with a position limiting block a (15), and a side wall of the position limiting block a (15) is provided with a through-hole (16).

3. The two-screw adjustable position limiting device according to claim 1, wherein the surface of the fixing base (1) is provided with an annular recess (10), wherein the annular recess (10) has a first end, a middle, and a second end, the middle of the annular recess (10) is provided with an engagement recess (9) for fixing a position limiting block a (15), and a hole (17) is provided at a side of the engagement recess (9).

4. The two-screw adjustable position limiting device according to claim 1, wherein the perforation is a non-circular hole, and upper and lower sides of the perforation are parallel to each other, and left and right sides of the perforation are curved.

5. The two-screw adjustable position limiting device according to claim 1, wherein the cross core rod body (8) is provided in the accommodating body b (19), a head portion of the cross core rod body (8) is a cross core base, and a cross-section of the cross core base is cross-shaped.

6. The two-screw adjustable position limiting device according to claim 1, wherein a stop bar (23) is provide at a middle of the bottom portion of the accommodating body c (22), the cross core rod body (8) is provided in the accommodating body c (22), a lower part of the cross core rod body (8) is provided with a fastener (21), the fastener (21) is fastened on two sides of the bottom portion of the accommodating body c (22), and the spring (29) is provided between the bottom portion of the cross core rod body (8) and the stop bar (23).

7. The two-screw adjustable position limiting device according to claim 1, wherein the bottom portion of the accommodating body a (13) is provided with a screw engagement gap a (24), the rotary wheel (4) is provided with a screw engagement gap b (25), the screw engagement gap a (24) is in contact with the screw engagement gap b (25) via protrusions (26) on a side of the rotary wheel (4), and protrusions (26) are evenly distributed on a side wall of the rotary wheel (4).

8. The two-screw adjustable position limiting device according to claim 1, wherein fixing strips (27) are provided on upper and lower sides of a surface of the mounting plate (12), intervals are present between the fixing strips (27), and position limiting blocks b (27) arranged on two sides of a rear surface of the fixing plate (7) are engaged at the intervals.

* * * * *